(12) United States Patent
Gregorich

(10) Patent No.: US 11,821,217 B2
(45) Date of Patent: Nov. 21, 2023

(54) BATHROOM FLOOR COVERING

(71) Applicant: Chanie Gregorich, Grand Junction, CO (US)

(72) Inventor: Chanie Gregorich, Grand Junction, CO (US)

(*) Notice: Subject to any disclaimer, the term of this patent is extended or adjusted under 35 U.S.C. 154(b) by 51 days.

(21) Appl. No.: 17/673,957

(22) Filed: Feb. 17, 2022

(65) Prior Publication Data
US 2022/0282496 A1 Sep. 8, 2022

Related U.S. Application Data

(60) Provisional application No. 63/156,665, filed on Mar. 4, 2021.

(51) Int. Cl.
| | | |
|---|---|---|
| *E04F 15/10* | (2006.01) | |
| *E04F 15/02* | (2006.01) | |
| *A47K 3/00* | (2006.01) | |
| *A47G 27/02* | (2006.01) | |
| *B32B 5/18* | (2006.01) | |

(52) U.S. Cl.
CPC ........ *E04F 15/107* (2013.01); *A47G 27/0206* (2013.01); *A47G 27/0225* (2013.01); *A47K 3/002* (2013.01); *B32B 5/18* (2013.01); *E04F 15/02188* (2013.01); *E04F 15/105* (2013.01); *B32B 2471/04* (2013.01); *E04F 2201/0153* (2013.01)

(58) Field of Classification Search
CPC .................. E04F 15/107; E04F 15/105; E04F 2201/0153; E04F 15/102; E04F 15/02188; A47K 3/002; A47G 27/0225; A47G 27/0206; B32B 2471/04; B32B 5/18

USPC ................................ D6/583; 4/251.1; 428/80
See application file for complete search history.

(56) References Cited

U.S. PATENT DOCUMENTS

| | | | | |
|---|---|---|---|---|
| 4,285,075 | A * | 8/1981 | Nelson .................... | A47K 17/00 4/251.1 |
| 6,295,658 | B1 * | 10/2001 | Jenkins .............. | A47G 27/0225 4/251.1 |
| 6,446,275 | B1 * | 9/2002 | Wright ..................... | B32B 7/02 4/251.1 |
| D498,964 | S * | 11/2004 | Spencer ........................ | D6/583 |
| 10,779,670 | B1 * | 9/2020 | Day .................... | A47G 27/0225 |

(Continued)

FOREIGN PATENT DOCUMENTS

| | | | | |
|---|---|---|---|---|
| JP | H11285458 | A | * 10/1999 | |
| JP | 2002309755 | A | * 10/2002 | |
| WO | WO-2015078118 | A1 | * 6/2015 | ............. A47K 17/00 |

*Primary Examiner* — Brent W Herring
(74) *Attorney, Agent, or Firm* — Brennan, Manna & Diamond, LLC

(57) ABSTRACT

The present invention relates to a novel one-piece bathroom rug or floor covering designed to accommodate the floor area near fixtures in a bathroom. The bathroom rug features a toilet rug portion for covering surface area in front of a toilet bowl, a shower rug portion for covering surface area in front of the shower or tub and a sink basin rug portion for covering surface area below and in front of a sink. The toilet rug portion includes a cut-out contoured to a toilet base and adapted to receive therein the toilet base. The bathroom rug is a multi-layered structure and absorbs water, increases comfort and safety, and improves the overall aesthetic of a bathroom.

11 Claims, 4 Drawing Sheets

(56) References Cited

U.S. PATENT DOCUMENTS

2014/0141198 A1* 5/2014 Teran .................. B32B 5/26
  112/440
2019/0150647 A1* 5/2019 Olawumi ........... A47G 27/0225
2020/0360210 A1* 11/2020 Zoni, III .............. A47C 27/144

* cited by examiner

BATHROOM FLOOR COVERING

CROSS-REFERENCE TO RELATED APPLICATION

The present application claims priority to, and the benefit of, U.S. Provisional Application No. 63/156,665, which was filed on Mar. 4, 2021, and is incorporated herein by reference in its entirety.

FIELD OF THE INVENTION

The present invention relates generally to the field of home or décor accessories. More specifically, the invention relates to an improved bathroom rug that has a one-piece structure and is configured to cover a floor area near a toilet, shower, and sink for preventing excess water, moisture, and debris from staining the floor or creating a slippery surface. The bathroom rug has a toilet rug portion which fits around the base of the toilet, a shower rug portion and a basin rug portion, thus eliminating the need to have multiple carpets on the floor in a small bathroom. The rug is sized and shaped to fit the various plumbing fixtures within the bathroom. Accordingly, this disclosure makes specific reference thereto. Nonetheless, it is to be appreciated that aspects of the present invention are also equally applicable to other like applications, devices and methods of manufacture.

BACKGROUND

By way of background, rugs and other floor coverings have been around for millennia. For savvy bathers, bathroom rugs are commonly used and have been made in various shapes, sizes and designs to absorb water and moisture after a bath and to prevent slippery floor surfaces as well as to provide comfort from preventing bare feet from coming into contact with the cold floor. Often, a plurality of rugs is placed in the bathroom for providing proper floor coverage while preventing excess water, moisture and debris from accumulating or staining the ground. However, often separate rugs are needed to be placed in front of the sink, shower, toilet bowl and tub for providing proper coverage in the bathroom. Maintaining multiple rugs is not only difficult but is also time consuming and laborious. People desire a bathroom floor covering that has a single piece construction and covers the floor area near toilet, shower, sink and more.

Further, placement of multiple rugs or other floor coverings in a bathroom can cause tripping of a person over the rugs if the rugs or floor coverings are not appropriately fit to the area where the rugs are positioned. This may cause serious injury to the person and therefore people desire a single piece construction that can be placed on the floor to prevent slips and falls and forms an integrated décor piece with the various plumbing fixtures.

Multiple rugs when placed on floor in a small bathroom usually overlap the edges of each other that decreases the overall aesthetic of the bathroom. Further, the overlapping also causes a person to trip if an individual does not cut or trim the individual rugs to provide a better fit. Therefore, people need a single construction rug that can be placed in a small bathroom to avoid overlapping.

Conventional rugs placed near the tub, sink or toilet bowl are not usually absorbent enough to prevent water from seeping onto the floor or from creating puddles. People desire an improved rug or floor covering that can effectively absorb water to prevent water from accumulating on the floor.

Therefore, there exists a long felt need in the art for a bathroom rug or floor covering that has a single piece construction. There is also a long felt need in the art for an improved bathroom rug or floor covering that provides a proper floor coverage for preventing excess water, moisture and debris from accumulating on the floor or staining the floor area of the bathroom. Additionally, there is a long felt need in the art for an improved bathroom rug or floor covering that eliminates placement of multiple rugs or coverings in a bathroom. Moreover, there is a long felt need in the art for a modified bathroom rug or floor covering that prevents the need to have overlapping multiple rugs in a bathroom creating unnecessary ridges on the floor. Further, there is a long felt need in the art for a bathroom rug or floor covering that can be positioned easily on floor of a small bathroom without the need to overlap individual rugs. Furthermore, there is a long felt need in the art for a bathroom rug that effectively absorbs water and prevents water from accumulating on the floor. Finally, there is a long felt need in the art for a bathroom rug or floor covering and system that absorbs water, increases comfort and safety and improves the overall aesthetic of a bathroom.

The subject matter disclosed and claimed herein, in one embodiment thereof, comprises a one-piece bathroom rug shaped for accommodating different plumbing fixtures commonly found in a bathroom, such as a bidet, a toilet, shower, bathtub and a sink. The bathroom rug or floor covering is designed for small bathrooms and for eliminating placement of multiple rugs or other coverings in the bathroom. The bathroom rug or floor covering further includes a first portion configured as a basin rug portion or toilet rug portion, a second portion configured as a shower rug portion, and a third portion as toilet rug portion. The floor covering design can be further manipulated to provide a bidet portion and bathtub portion if these fixtures are in the bathroom. The toilet rug portion is adapted to extend in front of a toilet bowl on floor of the bathroom and includes a cut-out contoured to a toilet base and adapted to receive the toilet base and extending at least partly around the base of the toile. The shower rug portion is adapted to positioned in front of a shower area and the basin rug portion is adapted to be placed below a sink basin. The basin rug portion and the shower rug portion are permanently stitched along a first common edge and the toilet rug portion and the shower rug portion are permanently stitched along a second common edge for forming the one-piece structure of the bathroom rug. The rug has a common border that acts a periphery for the bathroom rug.

In a further embodiment, a floor covering is provided having a central portion configured to fit adjacent a main bathroom fixture such as a bathtub or shower, a first wing portion configured to fit by a sink basin or stand and a second wing portion configured to accommodate a base of a toilet or bidet. Additional wing or flooring portions may be provided to accommodate other fixtures that may be in the bathroom, including a radiator, heater, floor vents, cabinets and whirlpool tubes.

A method of creating a custom made floor covering for a bathroom, comprising the steps of initially providing an accessible on-line system and then providing measurements of a bathroom, the measurements including at least some of the fixtures in the bathroom. Alternatively, a user may enter in the make and model of the fixture and a database can be accessed to provide measurements for the fixture. Next, the user selects from a number of floor covering or rug options. The options may include color, texture, design elements or other aesthetic features. Next, the floor covering is cut based on the measurements. Additional cutting may be performed for other fixtures in the bathroom, such as a bidet, bathtub, cabinet, floor vents, radiators, heaters and whirlpool tubs. Then the pieces are sewn to achieve the design. A package is prepared for the customized rug and the rug is shipped to the user. Finally, the rug is placed in the bathroom.

In this manner, the single piece bathroom rug or floor covering of the present invention accomplishes all of the forgoing objectives and provides users with an improved bathroom rug that can be shaped to accommodate the floor area near a toilet, shower and sink. Further, the bathroom rug eliminates the need to have multiple carpets on the floor in a small bathroom. The rug has multiple layers that provide effective absorption of water to prevent seeping onto the floor.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a one-piece bathroom rug or floor covering for accommodating a toilet, shower, sink and other bathroom fixtures such as a bidet, bathtub, cabinet, floor vents, radiators, heaters and whirlpool tubs. The bathroom rug or floor covering includes a first portion such as a toilet rug portion, a second portion such as a shower rug portion and a third portion such as a basin rug portion. the first portion or toilet rug portion is adapted to extend in front of a toilet bowl on floor of the bathroom and includes a cut-out contoured to a toilet base and adapted to receive therein at least a portion of the toilet base. the second or shower rug portion is adapted to positioned in front the larger fixture of the bathroom such as a shower or bathtub area and the third or basin rug portion is adapted to be placed below and in front of a basin. The third portion or basin rug portion and the second portion or the larger fixture portion are permanently stitched along a first common edge and the first portion or toilet rug portion and the larger fixture or second or central portion are permanently stitched along a second common edge for forming the one-piece structure of the bathroom rug.

In yet another embodiment, the shape of the first portion or toilet rug portion is sufficiently long on each side for one to put his or her feet on the cutout rug portion while sitting on a toilet bowl or standing near the toilet or bidet.

In yet another embodiment, the shower rug portion is sufficiently long for one to stand on the larger fixture portion such as the shower, bathtub or whirlpool tub portion while drying off.

In yet another embodiment, the basin rug portion is sufficiently long for one to stand on the basin rug portion while using the basin.

In yet another embodiment, the basin rug portion is longer than the shower rug portion.

In yet another embodiment, a multi-layered single construction bathroom rug or floor covering is disclosed. The bathroom rug or floor covering is a one-piece construction and is designed for small bathrooms, and shaped for accommodating a toilet, shower and a sink as well as other fixtures that may be in the bathroom area such as a bidet, bathtub, cabinet, floor vents, radiators, heaters and whirlpool tubs. The bathroom rug or floor covering includes a plurality of layers sharing a common peripheral boundary. The plurality of layers includes a memory foam top layer such as a low-density memory foam, a second layer positioned below the top layer and made from Chenille fabric which resists pilling and wrinkling, a third layer below the second layer and is formed from a bamboo material and a fourth or bottom layer made from high density memory foam.

In yet another embodiment, the low-density memory foam has a density ranging from 5 lb/ft$^3$ to 8 lb/ft$^3$, and the high-density memory foam has a density ranging from 9 lb/ft$^3$ to 12 lb/ft$^3$.

In yet another embodiment, a method of preventing excess water, moisture and debris from accumulating on the ground in front of a toilet, shower, sink or other bathroom fixtures using a one-piece bathroom rug is disclosed. The method includes the steps of providing a one-piece bathroom rug or floor covering having a toilet rug portion, a shower rug portion and a basin rug portion. The toilet rug portion includes a cut-out contoured to a toilet base and adapted to receive at least a portion of the toilet base within the cutout area. The method further includes placing the rug on the floor of the bathroom in a desired position, such that the toilet rug portion is placed in front of a toilet bowl, the shower rug portion is placed in front of the shower, and the basin rug portion is positioned below the basin. The one-piece bathroom rug absorbs water, increases comfort and safety and improves the overall aesthetic of the bathroom.

In yet another embodiment, the bathroom rug comes in a plurality of colors and designs.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
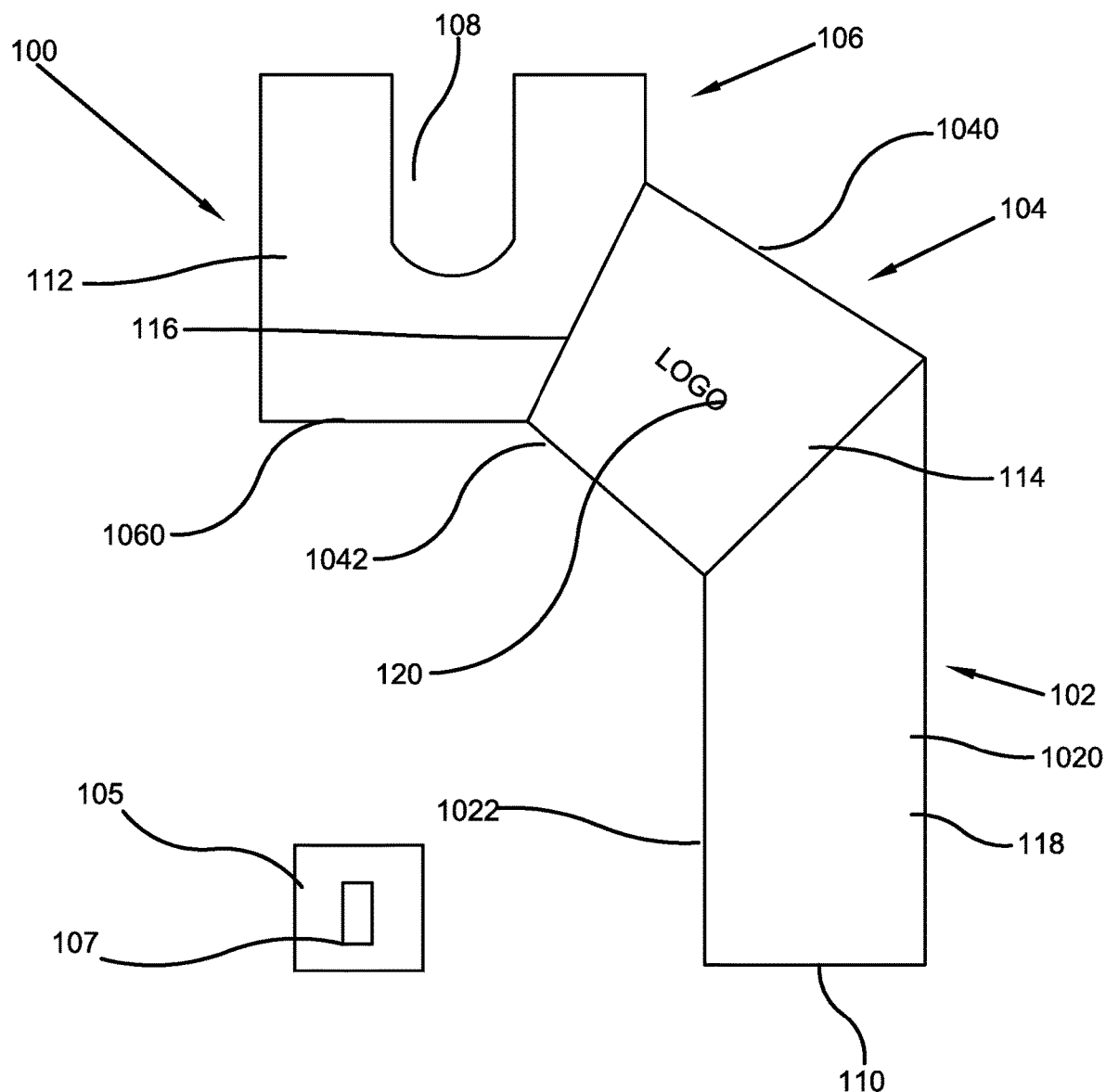
FIG. 1 illustrates a perspective view of one potential embodiment of the single construction bathroom rug of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a bathroom rug or floor covering that has a single piece, unitary construction. There is also a long felt need in the art for an improved bathroom rug or floor covering that provides a proper floor coverage for preventing excess water, moisture, and debris from accumulating on the ground. Additionally, there is a long felt need in the art for an improved bathroom rug or floor covering that eliminates placement of multiple, individual rugs in a bathroom. Moreover, there is a long felt need in the art for a modified bathroom rug or floor covering that prevents overlapping of multiple, individual rugs in a bathroom. Further, there is a long felt need in the art for a bathroom rug or floor covering that can be easily positioned on a floor of a small bathroom without the need to overlap individual rugs. Furthermore, there is long felt need in the art for a bathroom rug or floor covering that effectively absorbs water and preventing water from accumulating on the floor. Finally, there is a long felt need in the art for a bathroom rug or floor covering and system that absorbs water, increases comfort and safety, and improves the overall aesthetic of a bathroom.

The present invention, in one exemplary embodiment, is a novel method of preventing excess water, moisture and debris from accumulating in front of a toilet, shower, a sink and other areas of a small bathroom using a one-piece floor covering or rug. The method includes the steps of providing a one-piece bathroom rug having a toilet rug portion, a shower rug portion, and a sink basin rug portion. The toilet rug portion has a cut-out contoured to a toilet base and adapted to receive at least a portion of the toilet base. The method further comprises placing the rug on the floor of the bathroom in a desired position, such that the toilet rug portion is placed in front of a toilet bowl, the shower rug portion is placed in front of the shower, and the basin rug portion is positioned below the basin. The one-piece bathroom rug absorbs water, increases comfort and safety and improves the overall aesthetic of the bathroom.

Referring initially to the drawings, FIG. 1 illustrates a perspective view of one potential embodiment of the single or unitary construction floor covering or rug of the present invention in accordance with the disclosed specification. The rug or flooring cover 100 has a single or unitary piece construction and is designed for use in small bathrooms and shaped for accommodating a toilet, shower, sink or other fixtures which may be present in a bathroom. The rug or floor covering 100 has at least a first shaped or rectangular portion 102, a second shaped or rectangular portion 104 and a third shaped or rectangular portion 106. It should be understood that while certain shapes may lend themselves to the described embodiment, e.g., square or rectangular, the invention is not so limited, and each portion may have a geometric shape or a fanciful shape. The first portion 102 and the second portion 104 are permanently sewn, stitched or otherwise attached along a first common edge 114. The second portion 104 and the third portion 106 are permanently sewn, stitched or otherwise attached along a second common edge 116. The permanently sewn or attached edges 114, 116 form a single-piece construction of the rug 100 and the rug 100 can be folded along the edges 114, 116 for transportation and storage. Other pieces may be made during the manufacturing process, such as 105 which has a cut out area 107, so that the piece may be used over vent covers, cabinets or the like.

Figure 3:
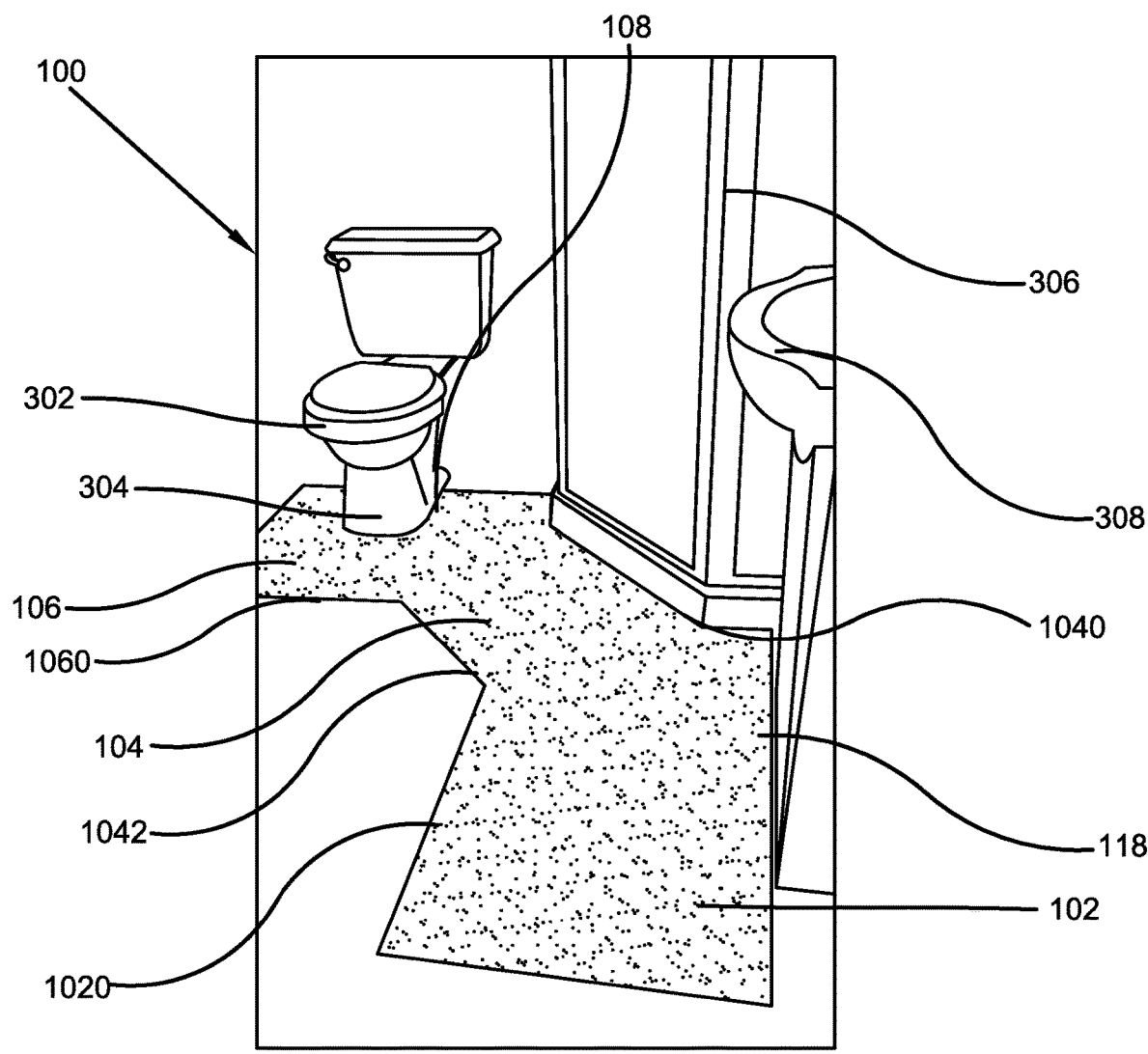
FIG. 3 illustrates a perspective view of the single construction bathroom rug or floor covering of the present invention applied to a standard small bathroom in accordance with the disclosed architecture.

The third portion 106 has a toilet base slot 108 designed as a cut out for accommodating at least a portion of a toilet base 108 as best shown in FIG. 3. The toilet base slot 108 is designed to be placed around any conventional or standard toilet or bidet base to cover the toilet, bidets and similar fixtures and thus, the third component 106 acts as a toilet or bidet rug. The first portion 102 functions as sink basin rug as the first portion 102 is preferably placed under a sink basin as shown in FIG. 3. and as in standard bathrooms. The large fixture portion such as to accommodate a shower area, bathtub, whirlpool or the like is placed between the toilet and the sink basin, therefore the second portion 104 functions as a rug for the large fixture where a person can stand and dry off after taking a bath or shower.

The rug 100 extends from a first edge 110 to an opposite second edge 112 and can be designed to apply along the shower area, sink basin, and toilet area. The rug 100 has a border area 118 that can have a design or can be of the same or a different color. The first portion 102 has a proximal edge 1020 and a distal edge 1022, with the proximal edge 1020 preferably placed under a sink basin. Similarly, the second portion 104 has a proximal edge 1040 configured to be placed near the large fixture portion such as a shower, and the distal edge 1042 away from the shower, bathtub or whirlpool. The distal edge 1060 of the third portion 106 is placed in front of the toilet or bidet bowl as shown in FIG. 3. The second portion 104 can also have a Logo or other indicia 120 or a text such as "WELCOME" or the name of the owner or other suitable designs for aesthetic purposes.

It should be appreciated that although the portions 102, 104, 105, 106 shown in the present embodiment are generally rectangular but they can be of any shape depending on the design of the bathroom and positions of the toilet bowl, shower and basin. Further, the relative dimensions of the portions 102, 104, 105, 106 can be designed and modified as per dimensions of a bathroom in which the rug or floor covering 100 is to be applied.

Figure 2:
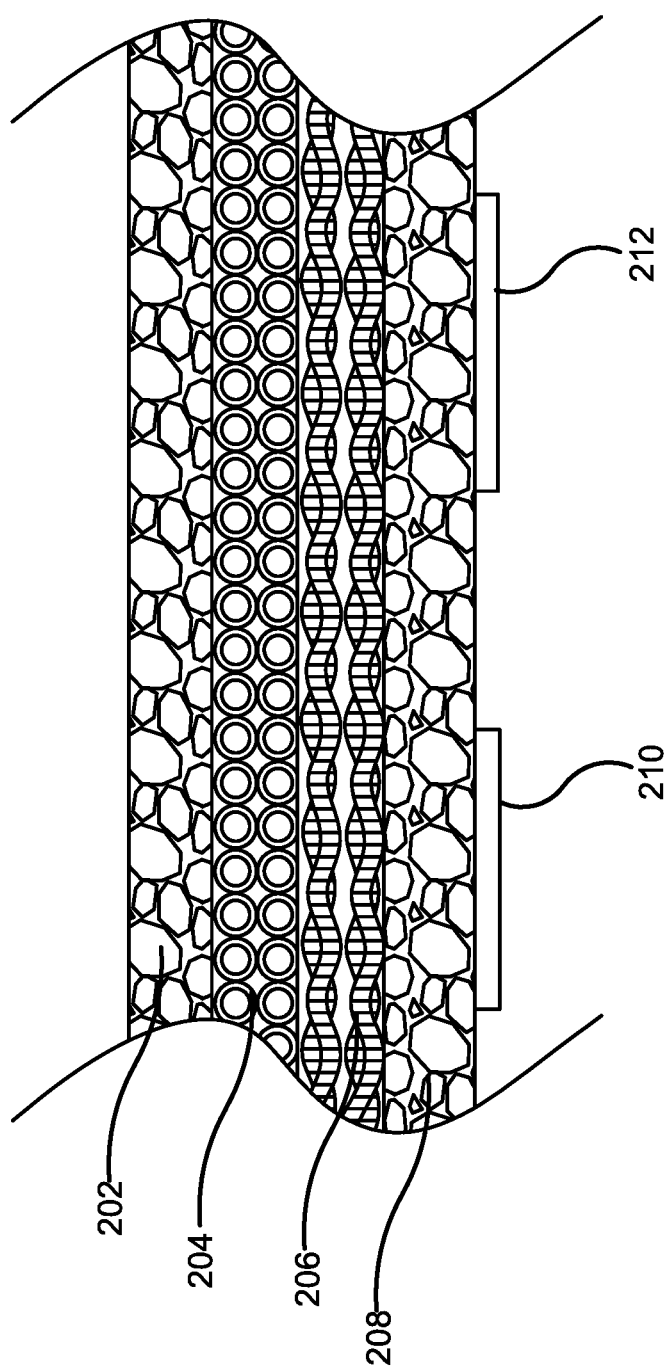
FIG. 2 illustrates a cross-sectional view of the single construction bathroom rug or floor covering of the present invention in accordance with the disclosed architecture.

FIG. 2 illustrates a cross-sectional view of the single construction bathroom rug or floor covering of the present invention in accordance with the disclosed specification. One advantage of the rug or floor covering 100 of the present invention is the capability to absorb water and moisture and thus preventing water from accumulating on the floor of the bathroom. The bathroom rug or floor covering 100 is a multilayered device that has a plurality of layers for effectively absorbing water and moisture and also not slipping on the floor.

More specifically, the rug 100 has a top (first) layer 202 made from memory foam. The memory foam top layer 202 does not get wet easily while absorbing water. Memory foam provides a soft and velvety touch when a user puts his or her feet on the rug 100. A second layer 204 is positioned below the top layer 202 and is made from Chenille fabric. The second layer 204 has polyester or poly-blend yarns that have an even, plush pile. Chenille fabric helps in maintaining shape of the rug 100 and resists pilling and wrinkling. Further, both synthetic and natural Chenille fabric can be used in the rug 100.

A third layer 206 is formed of bamboo as bamboo reduces drying time of the rug 100. Further, bamboo provides anti-skid properties to the rug and blends well with the Chenille fabric. Bamboo also increases strength and durability of the rug 100, is provided from a renewable resource and avoids complete tearing of the rug 100. The bottom layer 208 is again made from memory foam, however, a high-density memory foam is used in the bottom layer 208. The high-density memory foam offers supreme support and absorbs water on floor of the bathroom. The bottom layer 208 may also be provided with one or more rubberized feet 210 and 212 to prevent the rug or floor covering from slipping when placed on the floor.

The density of memory foam used in the top layer 202 ranges from 5 lb/ft$^3$ to 8 lb/ft$^3$ and the density of memory foam used in the bottom layer 208 ranges from 9 lb/ft$^3$ to 12 lb/ft$^3$. The bamboo layer 206 is the thinnest and can have a thickness in the range 3 mm-4 mm and the top layer 202 is the thickest and can have a thickness in the range 8 mm-10 mm.

FIG. 3 illustrates a perspective view of the single construction bathroom rug of the present invention applied to a standard small bathroom in accordance with the disclosed specification. As shown, the bathroom 300 has a toilet or bidet bowl 302 that has a base 304, a standing shower compartment 306 and a sink basin 308. It should be understood that the toilet or bidet bowl 302, base 304, the standing shower compartment 306 and the sink basin 308 are not a part of the rug 100 of the present invention. The rug 100 is applied to the bathroom 300 such that the toilet or bidet base slot 108 is positioned around the toilet or bidet base 304 to cover the contour of the toilet or bidet base 304 with the distal edge 1060 of the third portion 106 is positioned in front of the toilet or bidet bowl 302, thereby enabling the third component 106 to function as a toilet rug or floor covering.

The proximal edge 1040 of the second portion 104 is positioned along the wall of the shower 306 enabling the second portion 104 to resemble a standard shower rug with the distal edge 1042 placed away from the shower 306. The shower rug portion 104 covers the surface area in front of the large fixture or shower 306. The large fixture or shower rug portion 104 is also configured to cover the surface area in front of a large bathing fixture such as shower tub, bathtub, whirlpool tub or the like in a similar manner. Similarly, the first portion 102 resembles a sink basin rug or floor covering and is used by an individual for standing while using the sink basin 308. Based on the design of the bathroom, the second portion 104 can be used as a sink basin rug and the first portion 102 can be used as a large fixture shower rug without affecting the efficiency of the rug or floor covering 100.

In one embodiment of the present invention, the thickness of the rug 100 is uniform across the portions 102, 104, 105, 106. However, in another embodiment, the rug 100 has higher thickness for the second portion 104 or generally for the portion that functions as a bath or shower rug than the other two portions. More specifically, both the top layer and the bottom layer of the rug 100 can be made from high density memory to increase the thickness of the rug.

Figure 4:
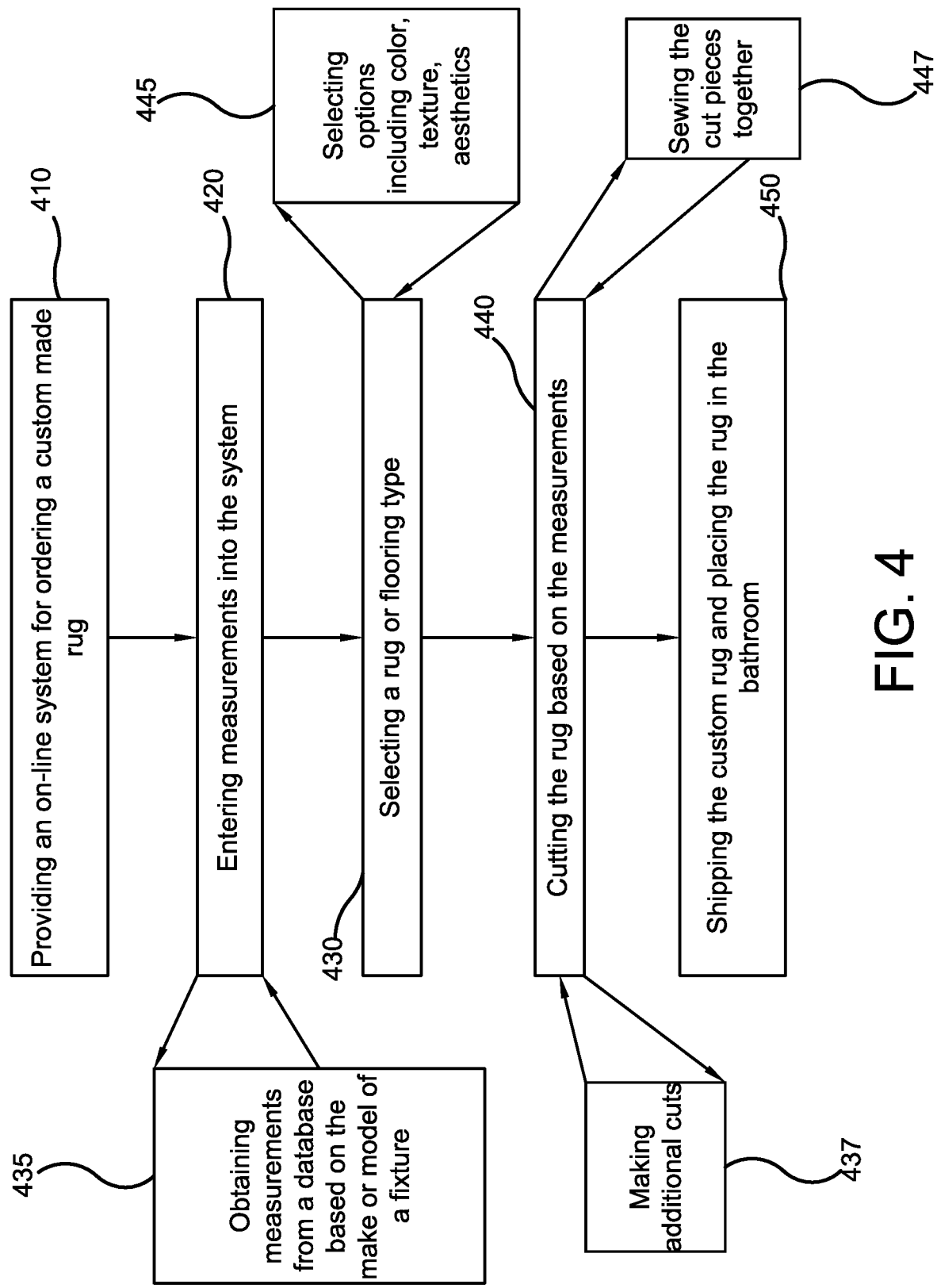
FIG. 4 illustrates a block diagram showing one potential method of producing a customized bathroom rug or floor covering in accordance with the disclosed architecture.

FIG. 4 provides a block diagram showing an exemplary method of creating a customed rug or floor covering. The method comprises the steps of initially providing an accessible on-line system at step 410 and then providing measurements of a bathroom at step 420. The measurements including at least some of the fixtures in the bathroom. Alternatively, a user may enter in the make and model of the fixture at step 435 and a database can be accessed to provide measurements for the fixture. Next, the user selects from a number of floor covering or rug options at step 430. The options may include color, texture, design elements or other aesthetic features at step 445. Next, the floor covering is cut based on the measurements at step 440. Additional cutting may be performed for other fixtures in the bathroom such as a bidet, bathtub, cabinet, floor vents, radiators, heaters and whirlpool tubs 437. The pieces are sewn or otherwise attached to complete the design at step 447. A package is prepared for the customized rug and the rug is shipped to the user at step 450 and the rug is placed in the bathroom.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "bathroom rug", "rug", "single construction bathroom rug" and "one piece bathroom rug" are interchangeable and refer to the one-piece bathroom rug 100 of the present invention.

Notwithstanding the forgoing, the one-piece bathroom rug 100 of the present invention can be of any suitable size and configuration as is known in the art without affecting the overall concept of the invention, provided that it accomplishes the above-stated objectives. One of ordinary skill in the art will appreciate that the one-piece bathroom rug 100 as shown in the FIGS. is for illustrative purposes only, and that many other sizes and shapes of the one-piece bathroom rug 100 are well within the scope of the present disclosure. Although the dimensions of the one-piece bathroom rug 100 are important design parameters for user convenience, the one-piece bathroom rug 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A unitary floor covering for a bathroom, the unitary floor covering comprising:
 a central portion configured to fit adjacent a large bathroom fixture, the central portion having a first edge and a second edge opposite the first edge;
 a first wing portion configured to fit by a sink basin;
 a top layer, a second layer, a third layer and a bottom layer, wherein top layer is a low-density memory foam, the second layer is a Chenille fabric, the third layer is a bamboo material and the bottom layer is a high density memory foam; and
 a second wing portion configured to accommodate a base of a toilet or bidet, wherein the second wing portion comprises a cut out area to surround at least a portion of the base, and further wherein the first wing portion and the second wing portion are joined to the central portion.

2. The unitary floor covering as recited in claim 1, wherein the large bathroom fixture is one of a shower, a bathtub or a whirlpool tub.

3. The unitary floor covering as recited in claim 1 further comprising at least one additional portion for placement adjacent a second fixture in the bathroom.

4. The unitary floor covering as recited in claim 3, wherein the second fixture is a select on of a bidet, a bathtub, a cabinet, a floor vent, a radiator, a heater and a whirlpool tub.

5. The unitary floor covering as recited in claim 1, wherein the central portion is thicker than each of the first wing portion and the second wing portion.

6. The unitary floor covering as recited in claim 1, wherein the second layer is positioned beneath the top layer, the third layer is positioned beneath the second layer and the bottom layer is positioned beneath the third layer.

7. The unitary floor covering as recited in claim 1, wherein the bottom layer comprises one or more rubberized feet.

8. The unitary floor covering as recited in claim 1, wherein the low-density memory foam has a density ranging from 5 $lb/ft^3$ to 8 $lb/ft^3$.

9. The unitary floor covering as recited in claim 1, wherein the high-density memory foam has a density ranging from 9 $lb/ft^3$ to 12 $lb/ft^3$.

10. The unitary floor covering as recited in claim 1, wherein the first wing portion and the second wing portion are attached by a sewing or a stitching.

11. A bathroom floor rug comprising:
 a first portion for use with a toilet;
 a second portion for positioning near a shower;
 a third portion for placement near a sink basin, wherein the second portion is thicker than each of the first and third portions;
 a top layer comprised of a low density foam having a density ranging from 5 $lb/ft^3$ to 8 $lb/ft^3$;
 a second layer;
 a third layer; and
 a bottom layer comprised of a high density foam having a density ranging from 9 $lb/ft^3$ to 12 $lb/ft^3$.

* * * * *